United States Patent
Liu et al.

(10) Patent No.: US 9,680,525 B2
(45) Date of Patent: Jun. 13, 2017

(54) SIGNAL PROCESSING METHOD IN DSL SYSTEM, APPARATUS, AND SYSTEM

(71) Applicant: Huawei Technologies Co., Ltd., Shenzhen, Guangdong (CN)

(72) Inventors: Jianhua Liu, Shenzhen (CN); Guozhu Long, Santa Clara, CA (US); Xiang Wang, Shenzhen (CN); Yixian Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 14/794,453

(22) Filed: Jul. 8, 2015

(65) Prior Publication Data

US 2015/0311949 A1 Oct. 29, 2015

Related U.S. Application Data

(63) Continuation of application No. PCT/CN2013/070292, filed on Jan. 10, 2013.

(51) Int. Cl.
*H04M 9/08* (2006.01)
*H04B 3/32* (2006.01)
(Continued)

(52) U.S. Cl.
CPC ............. *H04B 3/32* (2013.01); *H04L 25/085* (2013.01); *H04M 3/007* (2013.01); *H04M 11/062* (2013.01)

(58) Field of Classification Search
CPC ........ H04B 3/32; H04L 25/085; H04M 3/005; H04M 3/007; H04M 11/062
(Continued)

(56) References Cited

U.S. PATENT DOCUMENTS

| | | | |
|---|---|---|---|
| 8,681,843 B2 * | 3/2014 | Lu | H04B 3/32 375/224 |
| 2008/0049855 A1 * | 2/2008 | Duvaut | H04B 3/32 375/260 |

(Continued)

FOREIGN PATENT DOCUMENTS

| | | |
|---|---|---|
| CN | 101843000 A | 9/2010 |
| CN | 102136852 A | 7/2011 |

(Continued)

*Primary Examiner* — Van D Huynh
(74) *Attorney, Agent, or Firm* — Fish & Richardson P.C.

(57) ABSTRACT

Embodiments of the present invention provide a signal processing method in a DSL system. The method includes: determining that there is no to-be-sent downstream signal on m subscriber lines in n subscriber lines; superimposing a signal X on the m subscriber lines, so that a signal output on the m subscriber lines after precoding processing is 0, where $x_m$ indicates a signal component loaded on the $m^{th}$ subscriber line in the m subscriber lines; performing precoding processing on a downstream signal on the n subscriber lines; and sending the downstream signal that has undergone the precoding processing on another line except the m subscriber lines in the n subscriber lines. The embodiments of the present invention further provide a network-side device and a DSL system.

15 Claims, 5 Drawing Sheets

TDD frame

(51) Int. Cl.
*H04M 11/06* (2006.01)
*H04L 25/08* (2006.01)
*H04M 3/00* (2006.01)

(58) Field of Classification Search
USPC .................................................. 379/406.08
See application file for complete search history.

(56) References Cited

U.S. PATENT DOCUMENTS

| | | |
|---|---|---|
| 2008/0298444 A1 | 12/2008 | Cioffi et al. |
| 2009/0116582 A1 | 5/2009 | Ashikhmin et al. |
| 2011/0007788 A1* | 1/2011 | Cendrillon ............... H04B 3/32 |
| | | 375/222 |
| 2012/0195183 A1 | 8/2012 | Nuzman et al. |
| 2014/0029406 A1* | 1/2014 | Liang ........................ H04J 3/10 |
| | | 370/201 |
| 2014/0133534 A1 | 5/2014 | Shi |

FOREIGN PATENT DOCUMENTS

| | | |
|---|---|---|
| CN | 102318302 A | 1/2012 |
| EP | 2 043 276 A1 | 4/2009 |

\* cited by examiner

SIGNAL PROCESSING METHOD IN DSL SYSTEM, APPARATUS, AND SYSTEM

CROSS-REFERENCE TO RELATED APPLICATIONS

This application is a continuation of International Application No. PCT/CN2013/070292, filed on Jan. 10, 2013, which is hereby incorporated by reference in its entirety.

TECHNICAL FIELD

The present invention relates to the field of data communications, and in particular, to a signal processing method in a DSL system, an apparatus, and a system.

BACKGROUND

A digital subscriber line (DSL, Digital Subscriber Line) is a high-speed data transmission technology on a telephone twisted pair, such as an unshielded twist pair (UTP, Unshielded Twist Pair). A DSL system has multiple DSL lines. At present, a DSL access multiplexer (DSLAM, Digital Subscriber Line Access Multiplexer) is generally used to provide an access service for the multiple DSL lines. However, due to the electromagnetic induction principle, crosstalk (Crosstalk) may be generated between multiple signals that access the DSLAM. Crosstalk of a twisted pair on a high frequency is very strong. In order to cancel crosstalk, a vectored (Vectored) DSL technology may be used to cancel far-end crosstalk. When the Vectored DSL technology is not used, only 20-30% of an activated rate of a single subscriber line can be reached in most cases. However, if the Vector technology is used, a relatively high rate, even up to 90% of the activated rate of the single subscriber line, can be obtained.

Considering power saving and environment protection, there is a discontinue mode for power saving (Discontinue Mode for Power Saving, DMPS) technology in the DSL field at present. A main idea of the DMPS technology is that when there is no service data, a digital front end (Digital Front End, DFE) processing module, an analog front end (Analog Front End, AFE) processing module, and the like are shut down. The digital front end DFE processing module is, for example, a Fourier transform FFT module or an inverse Fourier transform IFFT module. The analog front end AFE processing module is, for example, a digital-to-analog/digital-to-analog conversion ADC/DAC module or a line driver module. Stopping these modules can reduce power consumption of a system substantially.

SUMMARY

Embodiments of the present invention provide a signal processing method in a DSL system, an apparatus, and a system, so as to reduce power consumption while improving a line rate and communication quality.

According to a first aspect, an embodiment of the present invention provides a signal processing method in a DSL system, where the DSL system includes a network-side device and n subscriber lines, the network-side device sends a downstream signal to n customer premises equipments through the n subscriber lines, and the method includes:

determining that there is no to-be-sent downstream signal on m (n>m≥1) subscriber lines in the n subscriber lines;

superimposing a signal $X=(x_1, x_2, \ldots, x_m)$ on the m subscriber lines, so that a signal output on the m subscriber lines after precoding processing is 0, where xm indicates a signal component loaded on the mth subscriber line in the m subscriber lines;

performing precoding processing on the downstream signal on the n subscriber lines; and sending the downstream signal that has undergone the precoding processing on another line except the m subscriber lines in the n subscriber lines.

In a first possible implementation manner of the first aspect, a value X of the superimposed signal is determined according to a transmission coefficient of the n subscriber lines and the to-be-sent downstream signal on the another line.

In a second possible implementation manner of the first aspect, the sending the downstream signal that has undergone the precoding processing on another line includes performing front-end processing on the downstream signal that has undergone the precoding processing on the another line, and sending the downstream signal that has undergone the front-end processing on the another line.

With reference to the second possible implementation manner of the first aspect, in a third possible implementation manner, the method further includes shutting down a front-end signal processing module on the m subscriber lines on a network side to skip the front-end processing on a downstream signal on the m subscriber lines.

With reference to the second possible implementation manner of the first aspect or the third possible implementation manner of the first aspect, in a fourth possible implementation manner, the front-end processing includes digital front end DFE processing and/or analog front end AFE processing on the downstream signal.

In a fifth possible implementation manner of the first aspect, a value of the superimposed signal is $X=-A^{-1}*C*W$, where A is an m*m channel matrix of the m subscriber lines, and W is an original to-be-sent downstream signal on the other (n−m) subscriber lines.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the method further includes: when a customer premises equipment on j (n>j≥1) subscriber lines in the n subscriber lines has no to-be-sent data signal, after a front-end signal processing module on the j subscriber lines is shut down on the network side, performing cancellation processing on an upstream signal on the n subscriber lines, and compensating for the upstream signal that has undergone the cancellation processing.

According to a second aspect, an embodiment of the present invention provides a network-side device, including a downstream signal compensation unit 801, a precoder 803, and n signal transceiver units 807;

the n signal transceiver units 807 send a downstream signal to n customer premises equipments through n subscriber lines, where the subscriber lines may specifically be twisted pairs;

the downstream signal compensation unit 801 is configured to: when determining that there is no to-be-sent downstream signal on m (n>m≥1) subscriber lines in the n subscriber lines, superimpose a signal $X=(x_1, x_2, \ldots, x_m)$ on the m subscriber lines, so that a signal output on the m subscriber lines after precoding processing is 0, where $x_m$ indicates a signal component loaded on the $m^{th}$ subscriber line in the m subscriber lines;

the precoder 803 is configured to perform precoding processing on the downstream signal on the n subscriber lines; and a signal transceiver unit 807 is configured to send the downstream signal that has undergone the precoding processing on another line except the m subscriber lines in the n subscriber lines.

In a first possible implementation manner of the second aspect, the network-side device 800 further includes n front-end signal processing modules 805, where each front-end signal processing module 805 is corresponding to one signal transceiver unit 807; the front-end signal processing modules 805 are configured to perform digital or analog front end processing on the downstream signal that has undergone the precoding processing on the n subscriber lines, where when there is no to-be-sent downstream signal on the m subscriber lines, front-end signal processing modules on the m subscriber lines are shut down to skip digital or analog front end processing; and the signal transceiver unit 807 sends the downstream signal that has been processed on the another line by a front-end processing module 805.

With reference to the second aspect or the first possible implementation manner of the second aspect, in a second possible implementation manner, a value of the superimposed signal is $X=-A^{-1}*C*W$, where A is an m*m channel matrix of the m subscriber lines, and W is an original to-be-sent downstream signal on the other (n−m) subscriber lines.

With reference to the second aspect or the first possible implementation manner of the second aspect, in a third possible implementation manner, the network-side device further includes a canceller 809, configured to perform cancellation processing on an upstream signal on the n subscriber lines; and the front-end signal processing modules 805 are further configured to perform digital or analog front end processing on the upstream signal on the n subscriber lines, where when there is no to-be-sent upstream signal on a subscriber line j in the n subscriber lines, a front-end signal processing module 805 on the subscriber line j is shut down to skip digital or analog front end processing.

With reference to the second aspect, the first possible implementation manner of the second aspect, the second possible implementation manner of the second aspect, or the third possible implementation manner of the second aspect, in a fourth possible implementation manner, the signal transceiver units 807 may receive, through a subscriber line, an upstream signal from a customer premises equipment on the corresponding line;

the network-side device further includes an upstream signal compensation unit 811 and an upstream signal demodulation unit 813, where the upstream signal compensation unit 811 is configured to compensate for the upstream signal that has undergone the cancellation processing on the n subscriber lines; and the upstream signal demodulation unit 813 is configured to demodulate the compensated upstream signal to obtain a bit stream.

According to a third aspect, an embodiment of the present invention provides a DSL system, including a network-side device 1001, n customer premises equipments 1003, and n subscriber lines 1005 connecting the network-side device 1001 to the n customer premises equipments 1003, where the n subscriber lines 1005 are twisted pairs;

the network-side device 1001 is configured to: when determining that there is no to-be-sent downstream signal on m (n>m≥1) subscriber lines in the n subscriber lines 1005, superimpose a signal $X=(x_1, x_2, \ldots, x_m)$ on the m subscriber lines, so that a signal output on the m subscriber lines after precoding processing is 0, where $x_m$ indicates a signal component loaded on the $m^{th}$ subscriber line in the m subscriber lines;

the network-side device 1001 performs precoding processing on the downstream signal $X=(x_1, x_2, \ldots, x_m)$ on the m subscriber lines and a downstream signal on another line, where the another line is (n−m) subscriber lines except the m subscriber lines in the n subscriber lines 1005; and the network-side device 1001 does not perform front-end processing on the signal on the m subscriber lines, performs front-end processing on the downstream signal that has undergone the precoding processing on the another line, and sends the downstream signal to a customer premises equipment 1003 through the another subscriber line.

In a first possible implementation manner of the third aspect, when a customer premises equipment on a subscriber line j in the n subscriber lines 1005 has no to-be-sent data signal, the network-side device 1001 does not perform front-end processing on a signal on the subscriber line j, performs cancellation processing on an upstream signal on the n subscriber lines 1005, and compensates for the upstream signal that has undergone the cancellation processing.

According to a fourth aspect, an embodiment of the present invention provides a computer readable storage medium, configured to store computer program code that is used to execute the forgoing signal processing method in a DSL system.

According to the solutions in the embodiments, after a signal $x_k$ is added on a line in a discontinue mode for power saving state, a front-end signal processing module on the line may be shut down to skip digital front end DFE processing and/or analog front end AFE processing on the line, which not only reduces power consumption, but also ensures that an SNR of each subscriber line in Vectored DSL is not reduced, communication quality does not degrade, and a data rate does not decrease.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
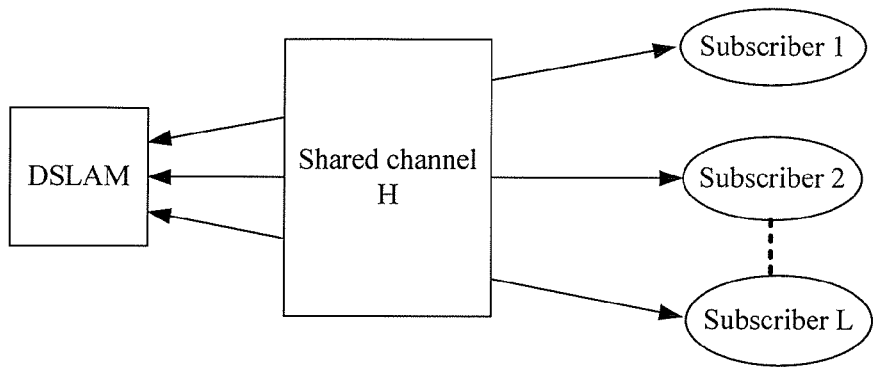
FIG. 1 is a schematic operating diagram of synchronous transmitting and synchronous receiving at a DSLAM end.

An existing Vectored DSL technology mainly uses a feature of joint receiving and transmitting at a DSLAM end, and uses a signal processing method to cancel FEXT interference, so as to finally cancel FEXT interference on each signal. FIG. 1 shows a schematic operating diagram of synchronous transmitting and synchronous receiving at the DSLAM end.

A downstream or an upstream shared channel H on the $k^{th}$ subcarrier (tone) in a frequency domain may be represented in a matrix form:

$$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{M1} & h_{M2} & \ldots & h_{MM} \end{bmatrix}_{M \times M}$$

where $h_{ij}$ indicates an equation of transmission from a wire pair j to a wire pair i. In an actual situation, i is equal to j and is equal to a quantity of lines in a Vectored DSL, system, which is set to M herein. Then, H is an M×M channel transmission matrix. x, y and n are respectively set to an M×1 channel input vector, an M×1 channel output vector, and an M×1 noise vector. Finally, a channel transmission equation is represented in the following form:

$y=Hx+n$

In an upstream signal transmission process, at a central office (Central Office, CO) end, a network-side device performs joint signal receiving processing, and a crosstalk canceller W is used at a receiving end. Then, a received signal is:

$\tilde{y}=Wy=WHx+Wn$

When WH is a diagonal matrix, crosstalk is canceled.

In a downstream signal transmission process, joint signal sending processing is performed at the CO end, and a precoder P is used at the CO end. Then, a sent signal is:

$\tilde{x}=Px$

The signal received at the receiving end is:

$\tilde{y}=H\tilde{x}+n=HPx+n$

When HP is a diagonal matrix, crosstalk is canceled.

It can be known from the foregoing that a key point of the Vectored-DSL technology is to estimate a downstream precoding matrix P and an upstream cancellation matrix W. By means of synchronization symbol (sync symbol) synchronization, a vectoring control entity (Vectoring Control Entity, VCE) allocates pilot sequences (Pilot Sequence) to all lines in a centralized manner; a transceiver unit on each subscriber line modulate, on a synchronization symbol, the pilot sequence allocated by the VCE; finally, the VCE receives a clipped error fed back by a corresponding CPE or the CO. According to the pilot sequence and the clipped error, the downstream precoding matrix P and the upstream cancellation matrix W can be estimated in the VCE, so as to finally cancel FEXT.

Figure 2:
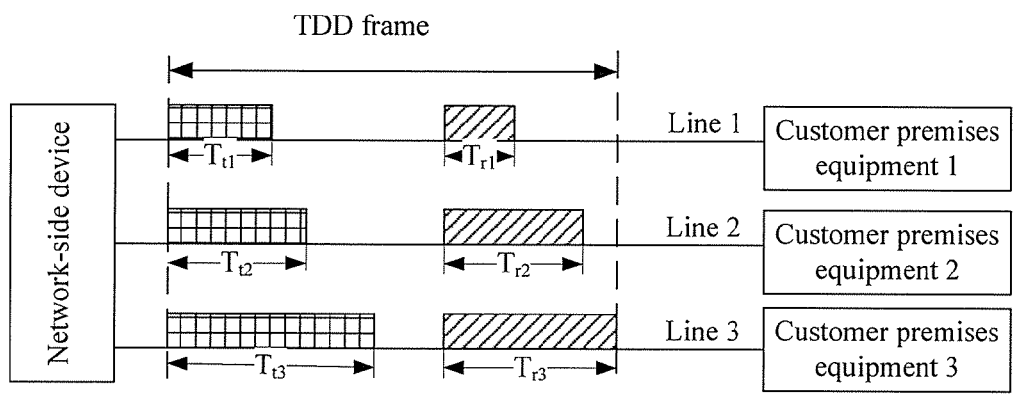
FIG. 2 is a schematic diagram of a user equipment in a discontinue mode for power saving according to an embodiment of the present invention.

Both the Vector technology and a discontinue mode for power saving technology are technologies in the DSL field. If they are simply combined for use, effects achieved are not combination of effects achieved when the two technologies are used separately. A research shows that, if the two technologies are simply used together, although a power saving effect can be achieved forcibly, a line SNR decreases, a communication rate decreases, and communication quality becomes poor. The following describes the principle first; for ease of description, a model of a scenario in which there are three subscriber lines is set. As shown in FIG. 2, they belong to a same vector group, a line 3 where a CPE (customer premises equipment) 3 is on is in a full power mode, and lines 1 and 2 where CPE 1 and CPE 2 are on are in a discontinue mode for power saving. Because sending time periods of sending time $T_{t1}$, $T_{t2}$, and $T_{t3}$ on the three subscriber lines are different, in some time periods, when the lines 2 and 3 send a data service signal, there may be no data service signal on the line 1 in a discontinue mode for power saving technology state. Likewise, receiving time periods of receiving time $T_{r1}$, $T_{r2}$, and $T_{r3}$ are different. In this way, in some time periods, when the lines 2 and 3 receive a signal, there may be no signal received on the line 1.

Figure 3:
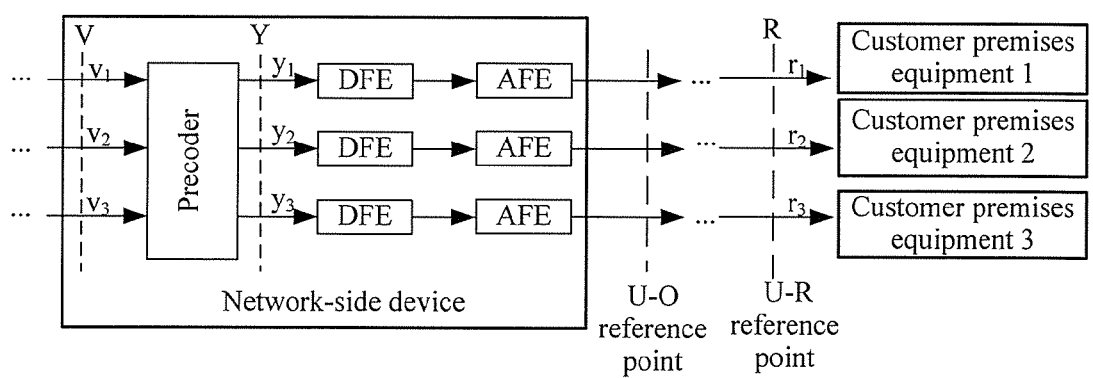
FIG. 3 is schematic diagram 1 of downstream signal processing according to an embodiment of the present invention.

FIG. 3 shows a downstream signal processing process in the scenario of the three subscriber lines. A network-side device and customer premises equipments are connected by using three twisted pairs, where a channel feature matrix of twisted pair lines is represented as $$H = \begin{bmatrix} h_{11} & h_{12} & h_{13} \\ h_{21} & h_{22} & h_{23} \\ h_{31} & h_{32} & h_{33} \end{bmatrix}.$$

According to a Vector technology principle, a precoding coefficient matrix of a precoder (precoder) in the network-side device should be $$P = H^{-1} = \begin{bmatrix} p_{11} & p_{12} & p_{13} \\ p_{21} & p_{22} & p_{23} \\ p_{31} & p_{32} & p_{33} \end{bmatrix}.$$

Network-side original to-be-sent signals on the three subscriber lines are represented as $V=[v_1,v_2,v_3]$, and signals output after the to-be-sent signals are processed by the precoder are:

$$Y = [y_1, y_2, y_3]$$

$$= [v_1, v_2, v_3] * \begin{bmatrix} p_{11} & p_{12} & p_{13} \\ p_{21} & p_{22} & p_{23} \\ p_{31} & p_{32} & p_{33} \end{bmatrix}$$

-continued $$= \begin{bmatrix} v_1 * p_{11} + v_2 * p_{21} + v_3 * p_{31} \\ v_1 * p_{12} + v_2 * p_{22} + v_3 * p_{32} \\ v_1 * p_{13} + v_2 * p_{23} + v_3 * p_{33} \end{bmatrix}^T$$

When the line 1 is in the discontinue mode for power saving state, that is, when there is no service data sending signal on the line 1, a signal on the line 1 is 0, that is, $v_1=0$.

$$[y_1, y_2, y_3] = \begin{bmatrix} 0 * p_{11} + v_2 * p_{21} + v_3 * p_{31} \\ 0 * p_{12} + v_2 * p_{22} + v_3 * p_{32} \\ 0 * p_{13} + v_2 * p_{23} + v_3 * p_{33} \end{bmatrix}^T$$

Obviously, $y_1$ is not equal to 0, but is equal to $v_2*p_{21}+v_3*p_{31}$. The reason is that when a signal on another line passes through the precoder, a signal v, $p_{21}+v_3*p_{31}$ is generated. To save power, a DFE module and an AFE module are forcibly shut down, so that the signal is not processed or sent. The following describes impact of this operation on another line.

Because signal errors are very small after a DFE module and an AFE module process signals on the lines 2 and 3, a signal variation may be ignored. In this case, a signal passing through the network-side device, that is, a signal at a U-O reference point, is represented as $Y=[y_1,y_2,y_3]=[v_2*p_{21}+v_3*p_{31},v_2*p_{22}++v_3*p_{32},v_2*p_{23}+v_3*p_{33}]$, and that the line 1 does not send a signal means that $y_1$ is forced to be 0, that is, $[0,v_2*p_{22}+v_3*p_{32},v_2*p_{23}+v_3*p_{33}]$.

In this case, a signal reaching a U-R reference point of a terminal device is:

$$C = [c_1, c_2, c_3]$$

$$= Y * H$$

$$= [0, v_2 * p_{22} + v_3 * p_{32}, v_2 * p_{23} + v_3 * p_{33}] * \begin{bmatrix} h_{11} & h_{12} & h_{13} \\ h_{21} & h_{22} & h_{23} \\ h_{31} & h_{32} & h_{33} \end{bmatrix}$$

$$= \begin{bmatrix} (v_2 * p_{22} + v_3 * p_{32}) * h_{21} + (v_2 * p_{23} + v_3 * p_{33}) * h_{31} \\ (v_2 * p_{22} + v_3 * p_{32}) * h_{22} + (v_2 * p_{23} + v_3 * p_{33}) * h_{32} \\ (v_2 * p_{22} + v_3 * p_{32}) * h_{23} + (v_2 * p_{23} + v_3 * p_{33}) * h_{33} \end{bmatrix}^T$$

Theoretically, a signal that should be received at a receiving end is:

$$R = [r_1, r_2, r_3][0, v_2, v_3] * \begin{bmatrix} p_{11} & p_{12} & p_{13} \\ p_{21} & p_{22} & p_{23} \\ p_{31} & p_{32} & p_{33} \end{bmatrix} * \begin{bmatrix} h_{11} & h_{12} & h_{13} \\ h_{21} & h_{22} & h_{23} \\ h_{31} & h_{32} & h_{33} \end{bmatrix}$$

$$= [v_2 * p_{21} + v_3 * p_{31}, v_2 * p_{22} + v_3 * p_{32}, v_2 * p_{23} + v_3 * p_{33}] * \begin{bmatrix} h_{11} & h_{12} & h_{13} \\ h_{21} & h_{22} & h_{23} \\ h_{31} & h_{32} & h_{33} \end{bmatrix}$$

$$= \begin{bmatrix} (v_2 * p_{21} + v_3 * p_{31}) * h_{11} + (v_2 * p_{22} + v_3 * p_{32}) * h_{21} + (v_2 * p_{23} + v_3 * p_{33}) * h_{31} \\ (v_2 * p_{21} + v_3 * p_{31}) * h_{12} + (v_2 * p_{22} + v_3 * p_{32}) * h_{22} + (v_2 * p_{23} + v_3 * p_{33}) * h_{32} \\ (v_2 * p_{21} + v_3 * p_{31}) * h_{13} + (v_2 * p_{22} + v_3 * p_{32}) * h_{23} + (v_2 * p_{23} + v_3 * p_{33}) * h_{33} \end{bmatrix}^T$$

An error of a signal received on all lines caused by the fact that the line 1 does not send a signal is:

$$E = [e_1, e_2, e_3]$$

$$= R - C$$

$$= \begin{bmatrix} (v_2 * p_{21} + v_3 * p_{31}) * h_{11} + (v_2 * p_{22} + v_3 * p_{32}) * h_{21} + (v_2 * p_{23} + v_3 * p_{33}) * h_{31} \\ (v_2 * p_{21} + v_3 * p_{31}) * h_{12} + (v_2 * p_{22} + v_3 * p_{32}) * h_{22} + (v_2 * p_{23} + v_3 * p_{33}) * h_{32} \\ (v_2 * p_{21} + v_3 * p_{31}) * h_{13} + (v_2 * p_{22} + v_3 * p_{32}) * h_{23} + (v_2 * p_{23} + v_3 * p_{33}) * h_{33} \end{bmatrix}^T -$$

$$\begin{bmatrix} (v_2 * p_{22} + v_3 * p_{32}) * h_{21} + (v_2 * p_{23} + v_3 * p_{33}) * h_{31} \\ (v_2 * p_{22} + v_3 * p_{32}) * h_{22} + (v_2 * p_{23} + v_3 * p_{33}) * h_{32} \\ (v_2 * p_{22} + v_3 * p_{32}) * h_{23} + (v_2 * p_{23} + v_3 * p_{33}) * h_{33} \end{bmatrix}^T$$

$$= \begin{bmatrix} (v_2 * p_{21} + v_3 * p_{31}) * h_{11} \\ (v_2 * p_{21} + v_3 * p_{31}) * h_{12} \\ (v_2 * p_{21} + v_3 * p_{31}) * h_{13} \end{bmatrix}^T$$

where $$[e_2, e_3] = \begin{bmatrix} (v_2 * p_{21} + v_3 * p_{31}) * h_{12} \\ (v_2 * p_{21} + v_3 * p_{31}) * h_{13} \end{bmatrix}^T$$

indicates an error of a signal received on the lines 2 and 3 caused by the fact that the line 1 does not send a signal. When crosstalk between subscribers is relatively weak, $[e_2, e_3]$ is relatively small. However, a frequency used in the Vector technology is very high, for example, G. fast, so that high-frequency crosstalk between the subscribers is very strong in this case. Strength of a common crosstalk signal is less than that of a direct signal (normal content signal) by 7-9 dB. When crosstalk is strong, strength of a crosstalk signal is less than that of a direct signal only by 2-3 dB, or even the strength of the crosstalk signal is larger than that of the direct signal. In this case, [e2,e3] is very large, which causes a dramatic decrease of a signal-to-noise ratio SNR at a subscriber receiving end and a rate decrease.

Figure 4:
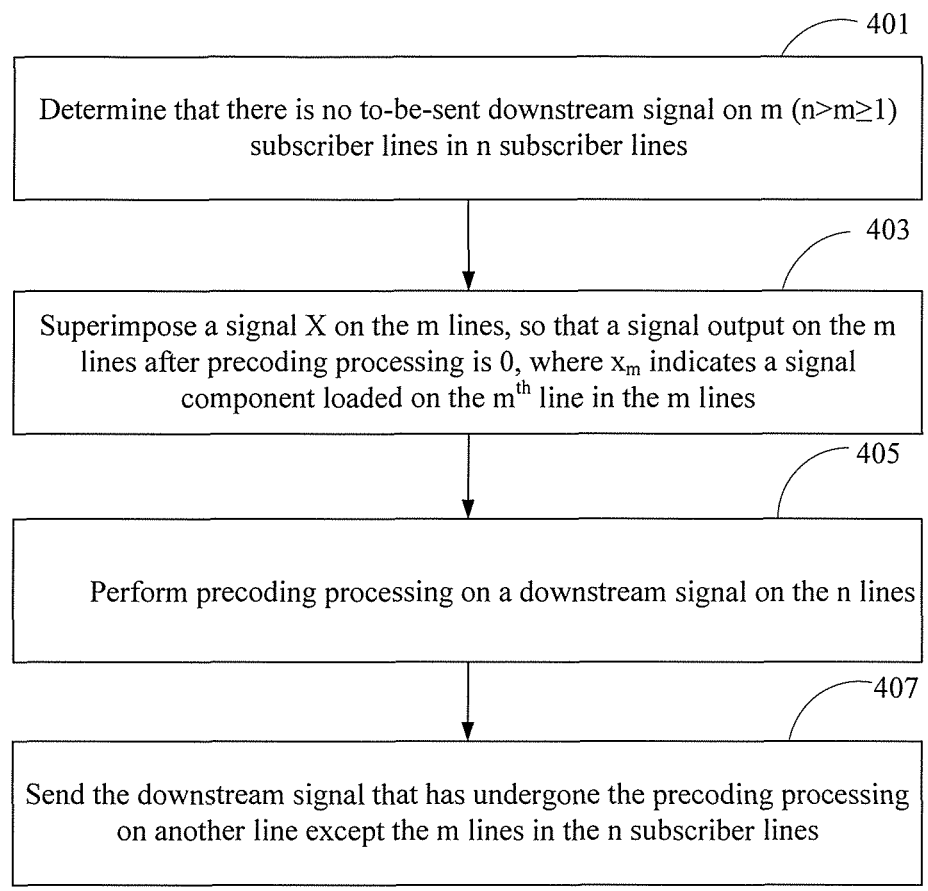
FIG. 4 is a flowchart of a method according to an embodiment of the present invention.

An embodiment of the present invention provides a signal processing method in a DSL system, where the DSL system includes a network-side device and n subscriber lines, and the network-side device sends a downstream signal to n customer premises equipments through the n subscriber lines. As shown in FIG. 4, the method includes:

Step 401. Determine that there is no to-be-sent downstream signal on m (n>m≥1) subscriber lines in the n subscriber lines.

Specifically, because a downstream signal is sent by the network-side device, the network-side device can determine a subscriber line on which there is a to-be-sent downstream signal or not. That there is no to-be-sent downstream signal means that there is no downstream service data to be sent.

Step 403. Superimpose a signal X=($x_1, x_2, \ldots, x_m$) on the m subscriber lines, so that a signal output on the m subscriber lines after precoding processing is 0, where $x_m$ indicates a signal component loaded on the $m^{th}$ subscriber line in the m subscriber lines.

Specifically, when the network-side device on the m subscriber lines has no to-be-sent downstream signal, that is, enters a power saving mode, the network-side device superimposes an extra downstream signal X=($x_1, x_2, \ldots, x_m$) on the m subscriber lines, so that the signal output on the m subscriber lines after precoding processing is 0, where a value of X may be determined according to a transmission coefficient (line transmission matrix) of the n subscriber lines and a to-be-sent downstream signal on another line. A specific calculation method will be further described below.

Step 405. Perform precoding processing on the downstream signal on the n subscriber lines.

Specifically, on a network side, the X signal superimposed on the m subscriber lines and the downstream signal on the another line are precoded together as new to-be-sent downstream signals by a precoder; the another line is (n−m) subscriber lines except the m subscriber lines in the n subscriber lines. Because the value of X is calculated according to a condition that the signal output on the m subscriber lines after the precoding processing is 0, after downstream signals on all the lines are precoded by the precoder in a centralized manner, a downstream signal output on all the m subscriber lines is 0.

Further, a precoding matrix used for the precoding processing is an inverse matrix of a transmission matrix on the n subscriber lines.

Step 407. Send the downstream signal that has undergone the precoding processing on another line except the m subscriber lines in the n subscriber lines.

Further, front-end processing is not performed on a downstream signal on the m subscriber lines, and the downstream signal sent.

The sending the downstream signal that has undergone the precoding processing on another line includes: performing front-end processing on the downstream signal that has undergone the precoding processing on the other line, and sending the downstream signal that has undergone the front-end processing on the other line.

Specifically, on the network side, front-end signal processing modules on the m subscriber lines are shut down. If the front-end signal processing module does not work, an output signal of a downstream device on the m subscriber lines is 0. A front-end processing module on the other line is not shut down, and may perform the front-end processing. A signal is sent after it is processed by the corresponding front-end processing module on the line.

The front-end processing includes digital front end DFE processing and/or analog front end AFE processing on the downstream signal.

The following description is made with reference to a specific scenario. For ease of description, the foregoing scenario in which there are three subscriber lines is still used as an example, but it should be understood that the scenario is merely an example, and the solution is applicable to any scenario in which there are two or more subscriber lines.

Figure 5:
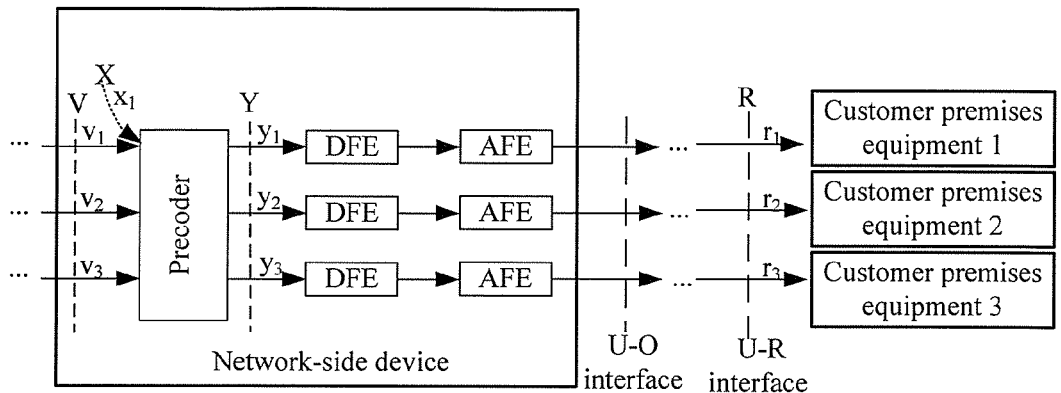
FIG. 5 is schematic diagram 2 of downstream signal processing according to an embodiment of the present invention.

When there is no downstream service data signal on a line 1, an extra signal $x_1$ is superimposed on the line 1. As shown in FIG. 5, in this case, a signal at a U-O reference point may be represented as:

$$Y = [0, y_2, y_3]$$

$$= [x_1, v_2, v_3] * \begin{bmatrix} p_{11} & p_{12} & p_{13} \\ p_{21} & p_{22} & p_{23} \\ p_{31} & p_{32} & p_{33} \end{bmatrix}$$

$$= \begin{bmatrix} x_1 * p_{11} + v_2 * p_{21} + v_3 * p_{31} \\ x_1 * p_{12} + v_2 * p_{22} + v_3 * p_{32} \\ x_1 * p_{12} + v_2 * p_{23} + v_3 * p_{33} \end{bmatrix}^T$$

To ensure that a downstream signal output on the line 1 after precoding is 0, that is, it is required that: $x_1*p_{11} + v_2*p_{21} + v_3*p_{31} = 0$, it can be obtained that:

$$x_1 = -\left(\frac{V_2 * P_{21} + V_3 * P_{31}}{P_{11}}\right).$$

According to $$x_1 = -\left(\frac{V_2 * P_{21} + V_3 * P_{31}}{P_{11}}\right),$$

a downstream signal obtained after downstream signals on the three subscriber lines are precoded in a centralized manner may be obtained, that is, a downstream signal at the U-O reference point, is:

$$Y = \begin{bmatrix} 0 \\ -\left(\dfrac{V_2 * P_{21} + V_3 * P_{31}}{P_{11}}\right) * P_{12} + V_2 * P_{22} + V_3 * P_{32} \\ -\left(\dfrac{V_2 * P_{21} + V_3 * P_{31}}{P_{11}}\right) * P_{13} + V_2 * P_{23} + V_3 * P_{33} \end{bmatrix}^T.$$

A received downstream signal that has been transmitted through the line and affected by line crosstalk, that is, a downstream signal at a U-R reference point, is:

$$R = [r_1, r_2, r_3]$$
$$= [x_1, v_2, v_3] * P * H$$
$$= \left[-\left(\dfrac{v_2 * p_{21} + v_3 * p_{31}}{p_{11}}\right), v_2, v_3\right] * \begin{bmatrix} p_{11} & p_{12} & p_{13} \\ p_{21} & p_{22} & p_{23} \\ p_{31} & p_{32} & p_{33} \end{bmatrix} *$$
$$\begin{bmatrix} h_{11} & h_{12} & h_{13} \\ h_{21} & h_{22} & h_{23} \\ h_{31} & h_{32} & h_{33} \end{bmatrix}$$
$$= \left[-\left(\dfrac{v_2 * p_{21} + v_3 * p_{31}}{p_{11}}\right), v_2, v_3\right].$$

It can be seen that received downstream signals on a line 2 and a line 3 are just equal to sent original signals $v_2$ and $v_3$, SNRs of the lines 2 and 3 are not affected, and the signal $$-\left(\dfrac{V_2 * P_{22} + V_3 + P_{31}}{P_{11}}\right)$$

obtained on the line 1 can be discarded.

Likewise, in a scenario in which there are n subscriber lines, a transmission matrix of the n subscriber lines is $$H = \begin{bmatrix} h_{11} & h_{12} & \cdots & h_{1n} \\ h_{21} & h_{22} & \cdots & h_{2n} \\ \vdots & \vdots & \ddots & \vdots \\ h_{n1} & h_{n2} & \cdots & h_{nn} \end{bmatrix},$$

and a corresponding precoding matrix is $$P = H^{-1} = \begin{bmatrix} p_{11} & p_{12} & \cdots & p_{1n} \\ p_{21} & p_{22} & \cdots & p_{2n} \\ \vdots & \vdots & \ddots & \vdots \\ p_{n1} & p_{n2} & \cdots & p_{nn} \end{bmatrix}.$$

It is assumed that there is no downstream service data signal to be sent on m subscriber lines, and in general, it is assumed that the m subscriber lines are the first m subscriber lines in the n subscriber lines.

According to whether a downstream signal is being sent on a subscriber line, the matrixes P and H are divided into submatrixes:

$$P = \begin{bmatrix} A & C \\ B & D \end{bmatrix}; \quad H = \begin{bmatrix} A' & C' \\ B' & D' \end{bmatrix}$$

where A is an m*m channel matrix on the m subscriber lines that do not send a signal; a block matrix C is an m*(n−m) channel matrix of crosstalk caused by the m subscriber lines, which do not send a signal, to the (n−m) subscriber lines that send a signal; and D is an (n−m)*(n−m) channel matrix on the (n−m) subscriber lines that send a signal. An original input signal on the (n−m) subscriber lines that send a signal is $W=[v_{m+1}, \ldots, v_n]^T$, and it is assumed that a compensated signal on the m subscriber lines that do not send a signal is $X=[x_1, \ldots, x_m]^T$.

Then, a signal that is output after precoding processing is $$P * \begin{bmatrix} X \\ W \end{bmatrix} = \begin{bmatrix} A & C \\ B & D \end{bmatrix} * \begin{bmatrix} X \\ W \end{bmatrix} = \begin{bmatrix} A*X + C*W \\ B*X + D*W \end{bmatrix}.$$

If it is set that an output of a precoder on the m subscriber lines that do not send a signal is 0, it can be obtained that: $A*X+C*W=0$.

According to the foregoing equations, the compensated signal on the m subscriber lines that do not send a signal may be obtained:

$X=-A^{-1}*C*W$, where A is the m*m channel matrix on the m subscriber lines, W is an original to-be-sent downstream signal on the other (n−m) subscriber lines, and C is the m*(n−m) channel matrix of the crosstalk caused by the m subscriber lines, which do not send a signal, to the (n−m) subscriber lines that send a signal.

In fact, the compensated signal may also be implemented in a manner of updating a coefficient matrix of the precoder. An output of the precoder may be represented as:

$$Y = P * \begin{bmatrix} X \\ W \end{bmatrix} = P * \begin{bmatrix} -A^{-1}*C*W \\ W \end{bmatrix};$$

after transformation, $$Y = P * \begin{bmatrix} 0 & -A^{-1}*C \\ 0 & I \end{bmatrix} * \begin{bmatrix} 0 \\ W \end{bmatrix},$$

and it is set that $$P' = P * \begin{bmatrix} 0 & -A^{-1}*C \\ 0 & I \end{bmatrix}.$$

The coefficient matrix P of the precoder is updated to be P', that is, Y=V*P'. In this way, it may also be achieved that the signal output on the m subscriber lines after the precoding processing is 0.

According to the solution in this embodiment, after a signal X is superimposed on a line in a discontinue mode for power saving state, a front-end signal processing module on the line may be shut down to skip digital front end DFE processing and/or analog front end AFE processing on the line, which not only reduces power consumption, but also ensures that an SNR of each subscriber line in Vectored DSL is not reduced, communication quality does not degrade, and a data rate does not decrease.

This embodiment further includes step 409 (not shown in the figure): when a customer premises equipment on j (n>j≥1) subscriber lines in the n subscriber lines has no to-be-sent data signal, after a front-end signal processing module on the j subscriber lines on a network side is shut down, perform cancellation processing on an upstream signal on the n subscriber lines, and compensate for the upstream signal that has undergone the cancellation processing.

Specifically, the network-side device can further receive upstream signals from the multiple customer premises equipments through the n subscriber lines. When the customer premises equipment on the j subscriber lines has no to-be-sent data signal, the front-end signal processing module on the j subscriber lines is shut down on the network side, that is, making the j subscriber lines in a power saving mode. Because a signal transmitted on the j subscriber lines is forced to be 0, crosstalk on another line becomes larger, and compensation for a signal sent by the network-side device to an upper-layer device is needed. The j subscriber lines may be the same as or different from the foregoing m subscriber lines.

For signal processing in an upstream direction, there is generally a canceller on the network side to perform cancellation processing on an error caused by crosstalk during signal transmission on a line. A cancellation (Cancellation) manner used by the canceller is similar to a precoding (Precoding) manner used by a precoder. A cancellation parameter of the canceller is directly related to a transmission matrix of a line, which is generally an inverse matrix of a transmission matrix of a subscriber line. Because the front-end signal processing module on the j subscriber lines is shut down to force the signal transmitted on the j subscriber lines to be 0, which may cause that processing performed by the canceller according to the cancellation parameter cannot completely cancel a line transmission crosstalk error, compensation needs to be performed after cancellation processing is performed on signals on all lines.

Figure 6:
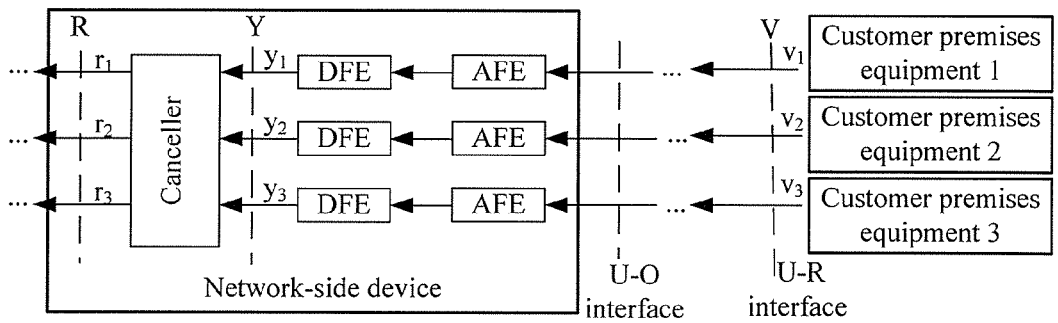
FIG. 6 is schematic diagram 1 of upstream signal processing according to an embodiment of the present invention.

The foregoing scenario in which there are three subscriber lines is still used. As shown in FIG. 6, a cancellation coefficient matrix of the canceller in the network-side device should be $$P = H^{-1} = \begin{bmatrix} p_{11} & p_{12} & p_{13} \\ p_{21} & p_{22} & p_{23} \\ p_{31} & p_{32} & p_{33} \end{bmatrix}.$$

In an upstream direction, to-be-sent signals of customer premises equipments 1, 2, and 3 on the three subscriber lines are represented as $V=[v_1, v_2, v_3]$, and a signal output after the signals on the three subscriber lines sequentially undergo line transmission and cancellation processing is:

$$R = V*H*P = [v_1, v_2, v_3] * \begin{bmatrix} h_{11} & h_{12} & h_{13} \\ h_{21} & h_{22} & h_{23} \\ h_{31} & h_{32} & h_{33} \end{bmatrix} * \begin{bmatrix} p_{11} & p_{12} & p_{13} \\ p_{21} & p_{22} & p_{23} \\ p_{31} & p_{32} & p_{33} \end{bmatrix}$$

It is assumed that the customer premises equipment 1 of a subscriber 1 has no to-be-sent data signal, that is, $v_1=0$. In this case, signals sent by senders of the three subscribers are $V=[0, v_2, v_3]$.

Signals reaching the canceller after the sent signals are transmitted over the lines, that is, input signals of the canceller, are $$Y = [y_1, y_2, y_3] =$$
$$V*H = [0, v_2, v_3] * \begin{bmatrix} h_{11} & h_{12} & h_{13} \\ h_{21} & h_{22} & h_{23} \\ h_{31} & h_{32} & h_{33} \end{bmatrix} = \begin{bmatrix} v_2*h_{21}+v_3*h_{31} \\ v_2*h_{22}+v_3*h_{32} \\ v_2*h_{23}+v_3*h_{33} \end{bmatrix}^T.$$

It can be seen from the foregoing equation that, although the sent signal of the customer premises equipment 1 is $v_1=0$, $y_1$ obtained after transmission is not 0 but $v_2\,h_{21}+v_3*h_{31}$, which is resulted from crosstalk caused by the other two subscriber lines to line 1 in the line transmission process.

If DFE and AFE modules on the line 1 are shut down, an input signal of the canceller on the line 1 is forced to be 0, that is, $$Y = \begin{bmatrix} 0 \\ v_2*h_{22}+v_3*h_{32} \\ v_2*h_{23}+v_3*h_{33} \end{bmatrix}^T.$$

In this case, an output signal C of the canceller is:

$$C = Y*P = \begin{bmatrix} 0 \\ v_2*h_{22}+v_3*h_{32} \\ v_2*h_{23}+v_3*h_{33} \end{bmatrix}^T * \begin{bmatrix} p_{11} & p_{12} & p_{13} \\ p_{21} & p_{22} & p_{23} \\ p_{31} & p_{32} & p_{33} \end{bmatrix} =$$
$$\begin{bmatrix} (v_2*h_{22}+v_3*h_{32})*p_{21}+(v_2*h_{23}+v_3*h_{33})*p_{31} \\ (v_2*h_{22}+v_3*h_{32})*p_{22}+(v_2*h_{23}+v_3*h_{33})*p_{32} \\ (v_2*h_{22}+v_3*h_{32})*p_{23}+(v_2*h_{23}+v_3*h_{33})*p_{33} \end{bmatrix}^T$$

However, theoretically, a signal expected to obtain after the cancellation processing performed by the canceller on the network side is:

$$R = V*H*P = \begin{bmatrix} v_2*h_{21}+v_3*h_{31} \\ v_2*h_{22}+v_3*h_{32} \\ v_2*h_{23}+v_3*h_{33} \end{bmatrix}^T * \begin{bmatrix} p_{11} & p_{12} & p_{13} \\ p_{21} & p_{22} & p_{23} \\ p_{31} & p_{32} & p_{33} \end{bmatrix} =$$

$$\begin{bmatrix} (v_2*h_{21}+v_3*h_{31})*p_{11}+(v_2*h_{22}+v_3*h_{32})*p_{21}+(v_2*h_{23}+v_3*h_{33})*p_{31} \\ (v_2*h_{21}+v_3*h_{31})*p_{12}+(v_2*h_{22}+v_3*h_{32})*p_{22}+(v_2*h_{23}+v_3*h_{33})*p_{32} \\ (v_2*h_{21}+v_3*h_{31})*p_{13}+(v_2*h_{22}+v_3*h_{32})*p_{23}+(v_2*h_{23}+v_3*h_{33})*p_{33} \end{bmatrix}^T$$

An error between an actual output signal output by the canceller and the theoretically output signal is represented as $E=[e_1,e_2,e_3]$. The error is also caused by the fact that the DFE and AFE modules on the line 1 are shut down to forcibly set the input signal of the canceller on the line 1 to 0.

$$E = [e_1, e_2, e_3] = R - C =$$

$$\begin{bmatrix} (v_2*h_{21}+v_3*h_{31})*p_{11}+(v_2*h_{22}+v_3*h_{32})*p_{21}+(v_2*h_{23}+v_3*h_{33})*p_{31} \\ (v_2*h_{21}+v_3*h_{31})*p_{12}+(v_2*h_{22}+v_3*h_{32})*p_{22}+(v_2*h_{23}+v_3*h_{33})*p_{32} \\ (v_2*h_{21}+v_3*h_{31})*p_{13}+(v_2*h_{22}+v_3*h_{32})*p_{23}+(v_2*h_{23}+v_3*h_{33})*p_{33} \end{bmatrix}^T -$$

$$\begin{bmatrix} (v_2*h_{22}+v_3*h_{32})*p_{21}+(v_2*h_{23}+v_3*h_{33})*p_{31} \\ (v_2*h_{22}+v_3*h_{32})*p_{22}+(v_2*h_{23}+v_3*h_{33})*p_{32} \\ (v_2*h_{22}+v_3*h_{32})*p_{23}+(v_2*h_{23}+v_3*h_{33})*p_{33} \end{bmatrix}^T = \begin{bmatrix} (v_2*h_{21}+v_3*h_{31})*p_{11} \\ (v_2*h_{21}+v_3*h_{31})*p_{12} \\ (v_2*h_{21}+v_3*h_{31})*p_{13} \end{bmatrix}^T$$

If $e_2$ and $e_3$ on a line 2 and a line 3 are represented as $e_1$, according to $$(v_2*h_{21}+v_3*h_{31}) = \frac{e_1}{P_{11}},$$

it may be obtained that:

$$e_2 = (v_2*h_{21}+v_3*h_{31})*p_{12} = \left(\frac{e_1}{p11}\right)*p_{12};$$

$$e_3 = (v_2*h_{21}+v_3*h_{31})*p_{13} = \left(\frac{e_1}{p11}\right)*p_{13}.$$

Figure 7:
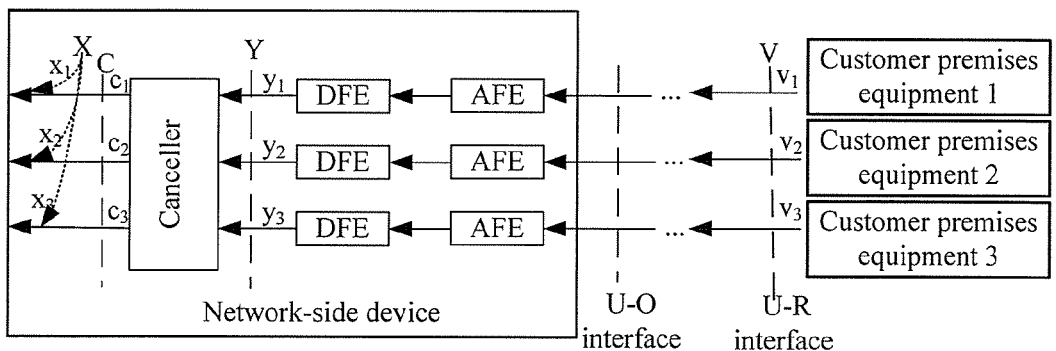
FIG. 7 is schematic diagram 2 of upstream signal processing according to an embodiment of the present invention.
Figure 8:
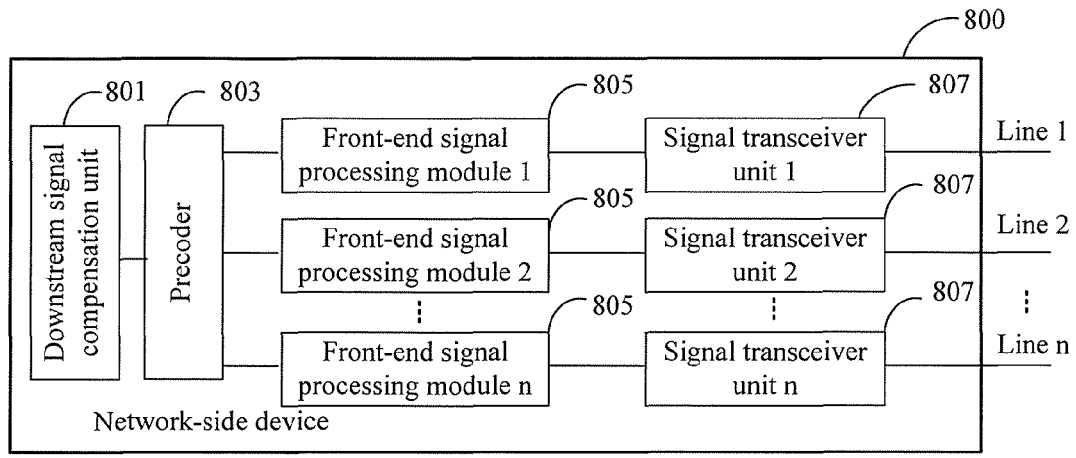
FIG. 8 is schematic structural diagram 1 of a network-side device according to an embodiment of the present invention.

As shown in FIG. 7, a signal required for error compensation performed on the output signal C of the canceller is required to be $X=[x_1, x_2, x_3]=[e_1, e_2, e_3]$, so that C that undergoes the error compensation is equal to an expected value R, and is also equal to the sent signal of the customer premises equipment, that is, $R=C+E=[e_1+c_1, e_2+c_2, e_3+c_3]=[0, v_2, v_3]$.

According to $e_1+c_1=0$, it is obtained that:

$$e_1 = -c_1;$$

$$e2 = \left(\frac{-c1}{p11}\right)*p_{12}$$

$$e3 = \left(\frac{-c1}{p11}\right)*p_{13}$$

Because $c_1$, $p_{11}$, $p_{12}$, and $p_{13}$ can all be determined in advance, the compensated signal $E=[e_1, e_2, e_3]$ can also be determined in advance.

An embodiment of the present invention further provides a network-side device 800, including a downstream signal compensation unit 801, a precoder 803, and n signal transceiver units 807, where the n signal transceiver units 807 may send a downstream signal to n customer premises equipments through n subscriber lines, and the subscriber lines may be specifically twisted pairs.

The downstream signal compensation unit 801 is configured to: when determining that there is no to-be-sent downstream signal on m (n>m≥1) subscriber lines in the n subscriber lines, superimpose a signal $X=(x_1, x_2, \ldots, x_m)$ on the m subscriber lines, so that a signal output on the m subscriber lines after precoding processing is 0, where $x_m$ indicates a signal component loaded on the $m^{th}$ subscriber line in the m subscriber lines.

The precoder 803 is configured to perform precoding processing on the downstream signal on the n subscriber lines.

A signal transceiver unit 807 is configured to send the downstream signal that has undergone the precoding processing on another line except the m subscriber lines in the n subscriber lines.

Specifically, a value of the signal superimposed by the downstream signal compensation unit 801 is $X=-A^{-1}*C*W$, where A is an m*m channel matrix on the m subscriber lines, and W is an original to-be-sent downstream signal on the other (n–m) subscriber lines.

Further, the network-side device 800 further includes n front-end signal processing modules 805, where each front-end signal processing module 805 is corresponding to one signal transceiver unit 807; the front-end signal processing modules 805 are configured to perform digital or analog front end processing on the downstream signal that has undergone the precoding processing on the n subscriber lines, where when there is no to-be-sent downstream signal on the m subscriber lines, front-end signal processing modules on the m subscriber lines are shut down to skip digital or analog front end processing; and the signal transceiver unit 807 sends the downstream signal that has been processed on the another line by a front-end processing module 805.

Figure 9:
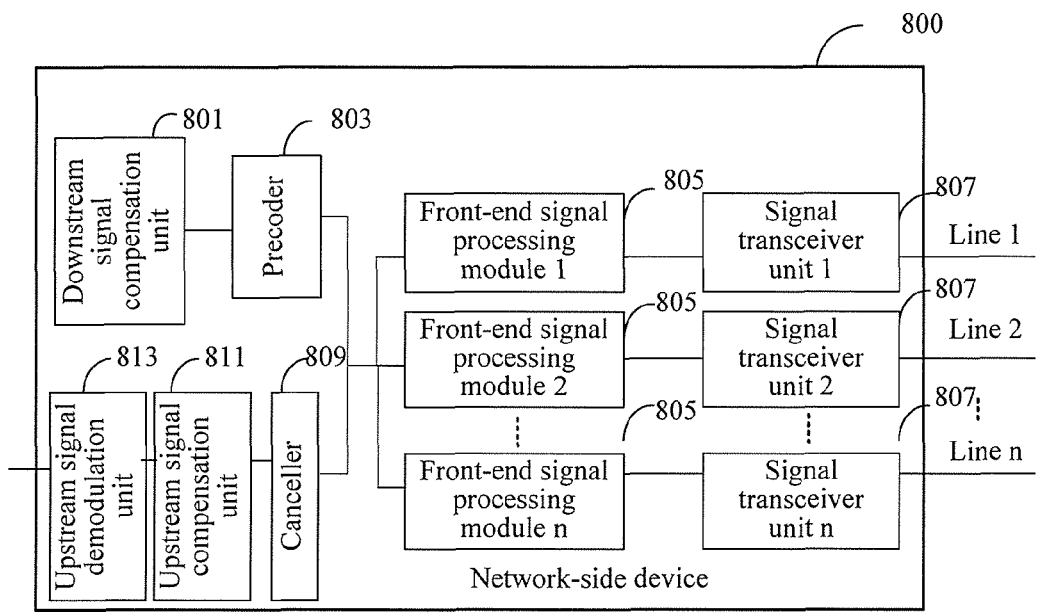
FIG. 9 is schematic structural diagram 2 of a network-side device according to an embodiment of the present invention.
Figure 10:
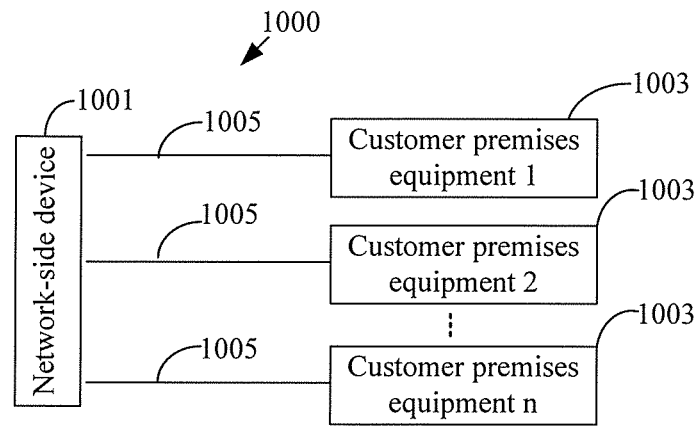
FIG. 10 is a structural diagram of a DSL system according to an embodiment of the present invention.

Further, the network-side device 800 further includes a canceller 809, as shown in FIG. 9.

The signal transceiver units 807 may receive, through a subscriber line, an upstream signal from a customer premises equipment on the corresponding line;

the canceller 809 is configured to perform cancellation (cancellation) processing on the upstream signal on the n subscriber lines; and the front-end signal processing modules 805 are further configured to perform digital or analog front end processing on the upstream signal on the n subscriber lines, where when there is no to-be-sent upstream signal on j subscriber lines in the n subscriber lines, a front-end signal processing module 805 on the j subscriber lines is shut down to skip digital or analog front end processing.

Further, the network-side device 800 further includes an upstream signal compensation unit 811 and an upstream signal demodulation unit 813, where the upstream signal compensation unit 811 is configured to compensate for the upstream signal that has undergone the cancellation processing on the n subscriber lines; and the upstream signal demodulation unit 813 is configured to demodulate the compensated upstream signal to obtain a bit stream.

It should be further noted that specific actions executed by the precoder, the downstream signal compensation unit, the multiple front-end signal processing modules and signal transceiver units in the network-side device are the method in the foregoing method embodiment, and specific steps are not repeated any further.

An embodiment of the present invention further provides a network system 1000, including a network-side device 1001, n customer premises equipments 1003, and n subscriber lines 1005 connecting the network-side device 1001 to the n customer premises equipments 1003, where the n subscriber lines 1005 are twisted pairs;

the network-side device 1001 is configured to: when determining that there is no to-be-sent downstream signal on m (n>m≥1) subscriber lines in the n subscriber lines 1005, superimpose a signal $X=(x_1, x_2, \ldots, x_m)$ on the m subscriber lines, so that a signal output on the m subscriber lines after precoding processing is 0, where $x_m$ indicates a signal component loaded on the $m^{th}$ subscriber line in the m subscriber lines;

the network-side device 1001 performs precoding processing on the downstream signal $X=(x_1, x_2, \ldots, x_m)$ on the m subscriber lines and a downstream signal on another line, where the another line is (n−m) subscriber lines except the m subscriber lines in the n subscriber lines 1005; and the network-side device 1001 does not perform front-end processing on the signal on the m subscriber lines, performs front-end processing on the downstream signal that has undergone the precoding processing on the another line, and sends the downstream signal to a customer premises equipment 1003 through the another subscriber line.

Further, when a customer premises equipment on j subscriber lines in the n subscriber lines 1005 has no to-be-sent data signal, the network-side device 1001 does not perform front-end processing on a signal on the j subscriber lines, performs cancellation processing on an upstream signal on the n subscriber lines 1005, and compensates for the upstream signal that has undergone the cancellation (cancellation) processing.

The network-side device 1001 is the network-side device 800 in the foregoing embodiment, and the customer premises equipments 1003 may be customer premises equipments (CPE) or other user terminal devices.

It should be further noted that specific actions executed by the network-side device are the method in the foregoing method embodiment, and specific steps are not repeated any further.

Figure 11:
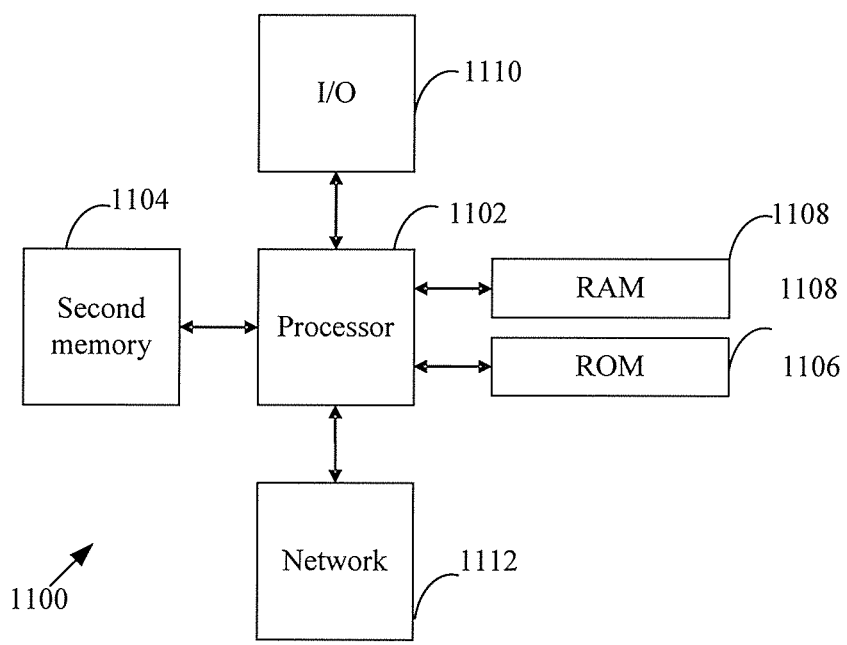
FIG. 11 is a schematic diagram of an embodiment of a general-purpose computer system according to an embodiment of the present invention.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc. Specifically, the foregoing network processing procedure may be implemented by, for example, a general part of a computer or a network part that has enough processing capabilities, memory resources, and network throughput capabilities. FIG. 11 illustrates an electrical universal network part 1100 that can be applied to implement one or more embodiments of the parts disclosed in this specification. The network part 1100 includes a processor 1102 (which may be called a central processing unit or CPU). The processor 1102 communicates with a memory device that includes a second memory 1104, a read-only memory (ROM) 1106, a random access memory (RAM) 1108, an input/output (I/O) device 1110, and a network connectivity device 1112. The processor 1102 may be implemented as one or more CPU chips, or implemented as a part of one or more application-specific integrated circuits.

The second memory 1104 typically includes one or more disk drives or disc drives, is used for non-volatile storage of data, and is used as an overflow data storage device if the RAM 1108 is unable to accommodate all working data. The second memory 1104 may be configured to store a program that is loaded into the RAM 1108 when it is selected to execute. The ROM 1106 is configured to store an instruction and/or data read when the program is being executed. The ROM 1106 is a non-volatile memory device, and typically has a relatively small memory capacity compared with a relatively large memory capacity of the second memory 1104. The RAM 1108 is configured to store volatile data, and may store an instruction. Access to the ROM 1106 and the RAM 1108 is generally faster than access to the second memory 1104.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal processing method in a digital subscriber line (DSL) system comprising a network-side device and n subscriber lines, the network-side device sends a downstream signal to n customer premises equipments through the n subscriber lines, the method comprising:
   determining there is no to-be-sent downstream signal on m subscriber lines in the n subscriber lines, wherein n>m≥1;
   superimposing a signal $X=(x_1, x_2, \ldots, x_m)$ on the m subscriber lines, wherein $x_m$ indicates a signal component loaded on the $m^{th}$ subscriber line in the m subscriber lines;
   performing precoding processing on the downstream signal on the n subscriber lines, wherein an amplitude of an output signal on the m subscriber lines after the precoding processing is 0, and a value of X is calculated according to a condition that the amplitude of the output signal on the m subscriber lines after the precoding processing is 0; and
   sending the downstream signal that has undergone the precoding processing on another line except the m subscriber lines in the n subscriber lines.

2. The method according to claim 1, wherein a value of the superimposed signal X is determined according to a transmission coefficient of the n subscriber lines and the to-be-sent downstream signal on the another line.

3. The method according to claim 1, wherein sending the downstream signal that has undergone the precoding processing on another line comprises:
   performing front-end processing on the downstream signal that has undergone the precoding processing on the another line, and sending the downstream signal that has undergone the front-end processing on the another line.

4. The method according to claim 3, wherein the method further comprises:
shutting down a front-end signal processor on the m subscriber lines on a network side to skip the front-end processing on the downstream signal on the m subscriber lines.

5. The method according to claim 3, wherein the front-end processing comprises:
at least one of a digital front end (DFE) processing or an analog front end (AFE) processing on the downstream signal.

6. The method according to claim 1, wherein a value of the superimposed signal is $X=-A^{-1}*C*W$, wherein A is an m*m channel matrix of the m subscriber lines, W is an original to-be-sent downstream signal on the another (n−m) subscriber lines, and C is the m*(n−m) channel matrix of the crosstalk caused by the m subscriber lines that do not send a signal to the (n−m) subscriber lines that send a signal.

7. The method according to claim 1, wherein the method further comprises: when a customer premises equipment on j (n>j≥1) subscriber lines in the n subscriber lines has no to-be-sent data signal, shutting down a front-end signal processor on the j subscriber lines on the network side, performing cancellation processing on an upstream signal on the n subscriber lines, and compensating for the upstream signal that has undergone the cancellation processing.

8. A network-side device, comprising:
n signal transceivers configured to send a downstream signal to n customer premises equipments through n subscriber lines;
a downstream signal compensator configured to: when determining there is no to-be-sent downstream signal on m (n>m≥1) subscriber lines in the n subscriber lines, superimpose a signal $X=(x_1, x_2, \ldots, x_m)$ on the m subscriber lines, wherein $x_m$ indicates a signal component loaded on the $m^{th}$ subscriber line in the m subscriber lines;
a precoder configured to perform precoding processing on the downstream signal on the n subscriber lines, wherein an amplitude of an output signal on the m subscriber lines after the precoding processing is 0, and a value of X is calculated according to a condition that the amplitude of the output signal on the m subscriber lines after the precoding processing is 0; and
a signal transceiver configured to send the downstream signal that has undergone the precoding processing on another line except the m subscriber lines in the n subscriber lines.

9. The network-side device according to claim 8, wherein:
the network-side device further comprises:
n front-end signal processors, wherein each front-end signal processor corresponds to one signal transceiver, the front-end signal processors are configured to perform digital or analog front end processing on the downstream signal that has undergone the precoding processing on the n subscriber lines, wherein when there is no to-be-sent downstream signal on the m subscriber lines, front-end signal processors on the m subscriber lines are shut down to skip digital or analog front end processing; and
the signal transceiver configured to send the downstream signal that has been processed on the another line by a front-end processor.

10. The network-side device according to claim 8, wherein a value of the superimposed signal is $X=-A^{-1}*C*W$, wherein A is an m*m channel matrix of the m subscriber lines, W is an original to-be-sent downstream signal on the another (n−m) subscriber lines, and C is the m*(n−m) channel matrix of the crosstalk caused by the m subscriber lines that do not send a signal to the (n−m) subscriber lines that send a signal.

11. The network-side device according to claim 8, wherein:
the network-side device further comprises a canceller configured to perform cancellation processing on an upstream signal on the n subscriber lines; and
the front-end signal processors are further configured to perform digital or analog front end processing on the upstream signal on the n subscriber lines, wherein when there is no to-be-sent upstream signal on a subscriber line j in the n subscriber lines, a front-end signal processor on the subscriber line j is shut down to skip digital or analog front end processing.

12. The network-side device according to claim 8, wherein:
the signal transceiver is configured to receive, through a subscriber line, an upstream signal from a customer premises equipment on the corresponding line; and
the network-side device further comprises an upstream signal compensator and an upstream signal demodulator, wherein the upstream signal compensator is configured to compensate for the upstream signal that has undergone the cancellation processing on the n subscriber lines, wherein the upstream signal demodulator is configured to demodulate the compensated upstream signal to obtain a bit stream.

13. A digital subscriber line (DSL) system, comprising:
a network-side device, n customer premises equipments, and n subscriber lines connecting the network-side device to the n customer premises equipments, wherein the n subscriber lines are twisted pairs; and
the network-side device is configured to:
when determining there is no to-be-sent downstream signal on m (n>≥1) subscriber lines in the n subscriber lines, superimpose a signal $X=(x_1, x_2, \ldots, x_m)$ on the m subscriber lines, wherein $x_m$ indicates a signal component loaded on the $m^{th}$ subscriber line in the m subscriber lines,
perform precoding processing on the signal $X=(x_1, x_2, \ldots, x_m)$ on the m subscriber lines and a downstream signal on another line, wherein an amplitude of an output signal on the m subscriber lines after the precoding processing is 0, and a value of X is calculated according to a condition that the amplitude of the output signal on the m subscriber lines after the precoding processing is 0, wherein the another line is (n−m) subscriber lines except the m subscriber lines in the n subscriber lines,
not perform front-end processing on the signal on the m subscriber lines,
perform front-end processing on the downstream signal that has undergone the precoding processing on the another line, and
send the downstream signal to a customer premises equipment through the another subscriber line.

14. The DSL system according to claim 13, wherein when a customer premises equipment on a subscriber line j in the n subscriber lines has no to-be-sent data signal, the network-side device is configured to:

not perform front-end processing on a signal on the subscriber line j, perform cancellation processing on an upstream signal on the n subscriber lines, and compensate for the upstream signal that has undergone the cancellation processing.

15. A non-transitory computer readable storage medium, configured to store computer program code that is used to execute a signal processing method in a digital subscriber line (DSL) system, wherein the DSL system comprises a network-side device and n subscriber lines, and wherein the network-side device sends a downstream signal to n customer premises equipments through the n subscriber lines, the signal processing method comprising:

determining there is no to-be-sent downstream signal on m ($n>m\geq1$) subscriber lines in the n subscriber lines;

superimposing a signal $X=(x_1, x_2, \ldots, x_m)$ on the m subscriber lines, wherein $x_m$ indicates a signal component loaded on the $m^{th}$ subscriber line in the m subscriber lines;

performing precoding processing on the downstream signal on the n subscriber lines, wherein an amplitude of an output signal on the m subscriber lines after the precoding processing is 0, and a value of X is calculated according to a condition that the amplitude of the output signal on the m subscriber lines after the precoding processing is 0; and sending the downstream signal that has undergone the precoding processing on another line except the m subscriber lines in the n subscriber lines.

* * * * *

UNITED STATES PATENT AND TRADEMARK OFFICE
CERTIFICATE OF CORRECTION

| | |
|---|---|
| PATENT NO. | : 9,680,525 B2 |
| APPLICATION NO. | : 14/794453 |
| DATED | : June 13, 2017 |
| INVENTOR(S) | : Jianhua Liu et al. |

It is certified that error appears in the above-identified patent and that said Letters Patent is hereby corrected as shown below:

In the Claims

In Column 20, In Line 42, in Claim 13, delete "$(n\!>\!\geq\!1)$" and insert -- $(n\!>\!m\!\geq\!1)$ --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*